May 12, 1959 J. PICKLES 2,886,094
SEAT ADJUSTING MECHANISM
Filed April 30, 1956 5 Sheets-Sheet 1
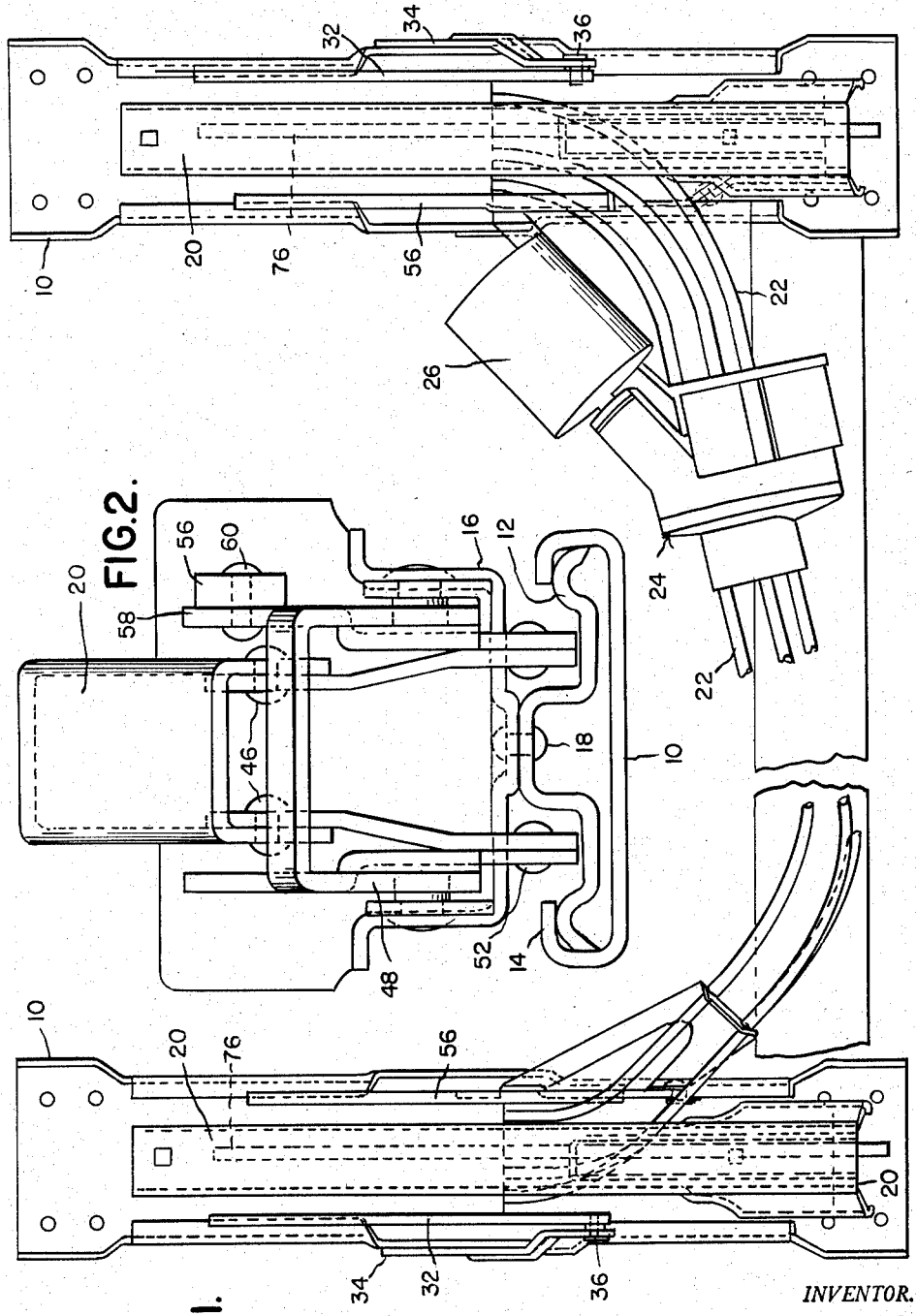
INVENTOR.
JOSEPH PICKLES
BY Whittemore,
Hulbert & Belknap
ATTORNEYS May 12, 1959  J. PICKLES  2,886,094
SEAT ADJUSTING MECHANISM
Filed April 30, 1956  5 Sheets-Sheet 2
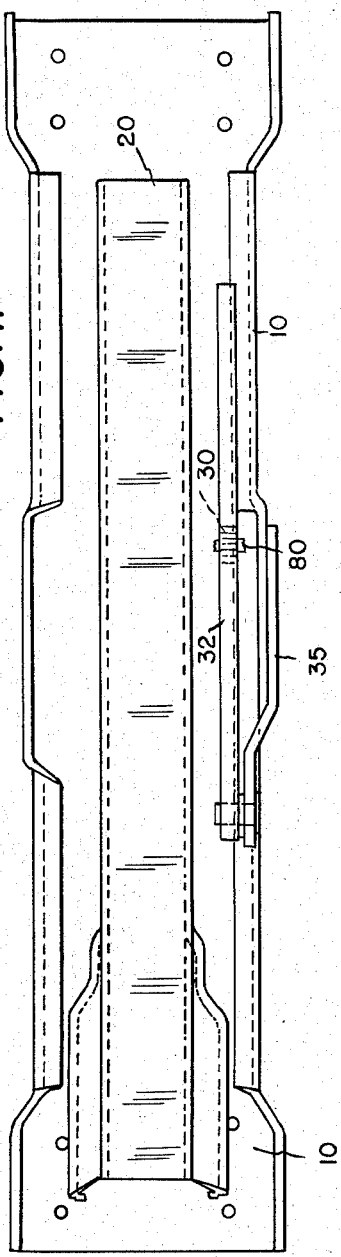
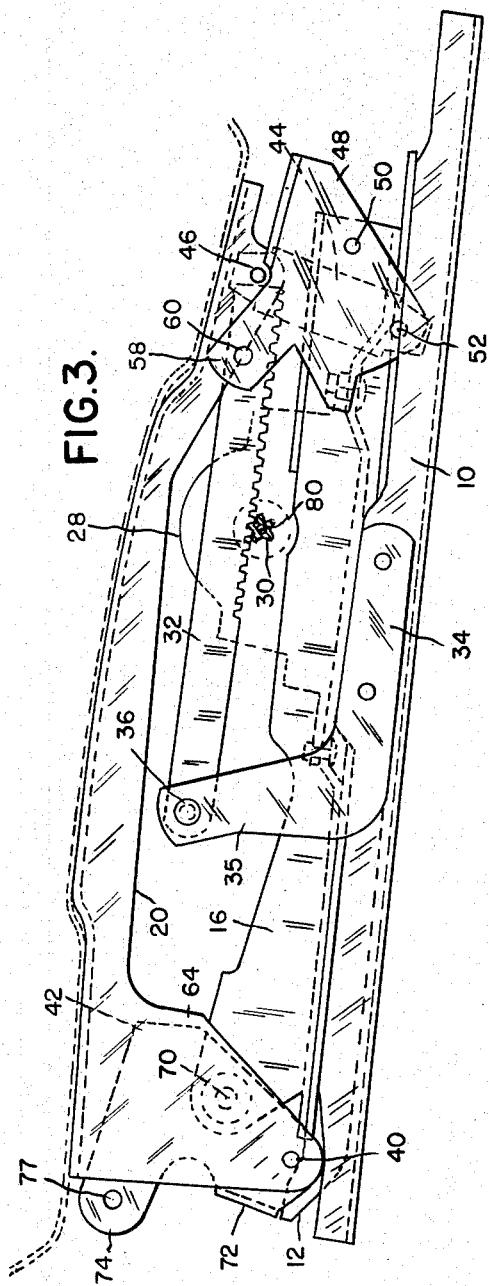
INVENTOR.
JOSEPH PICKLES
BY
ATTORNEYS

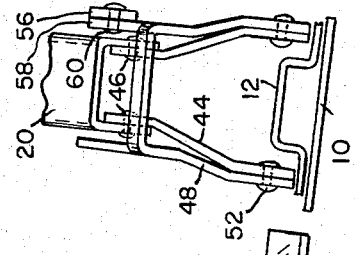
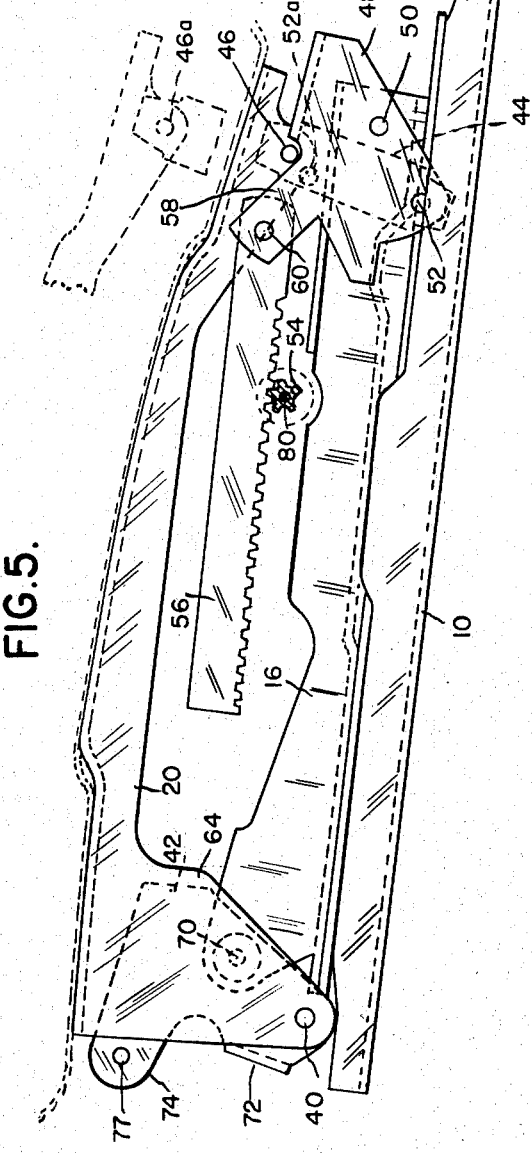
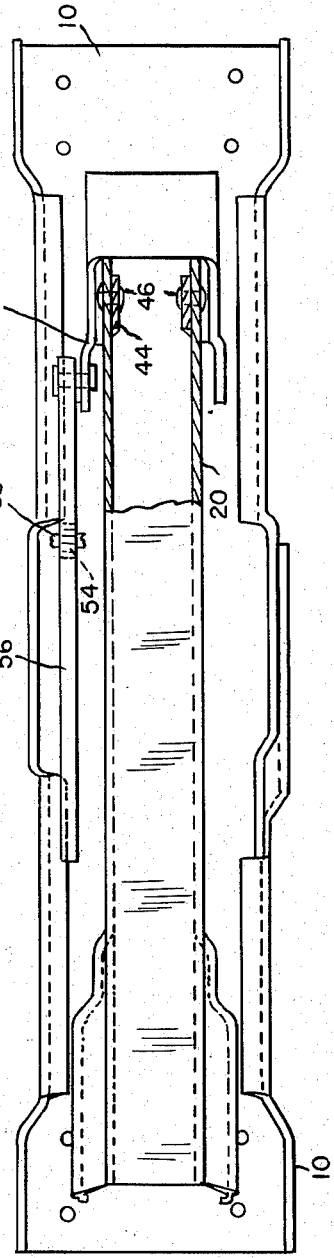

May 12, 1959        J. PICKLES        2,886,094
SEAT ADJUSTING MECHANISM
Filed April 30, 1956        5 Sheets-Sheet 4
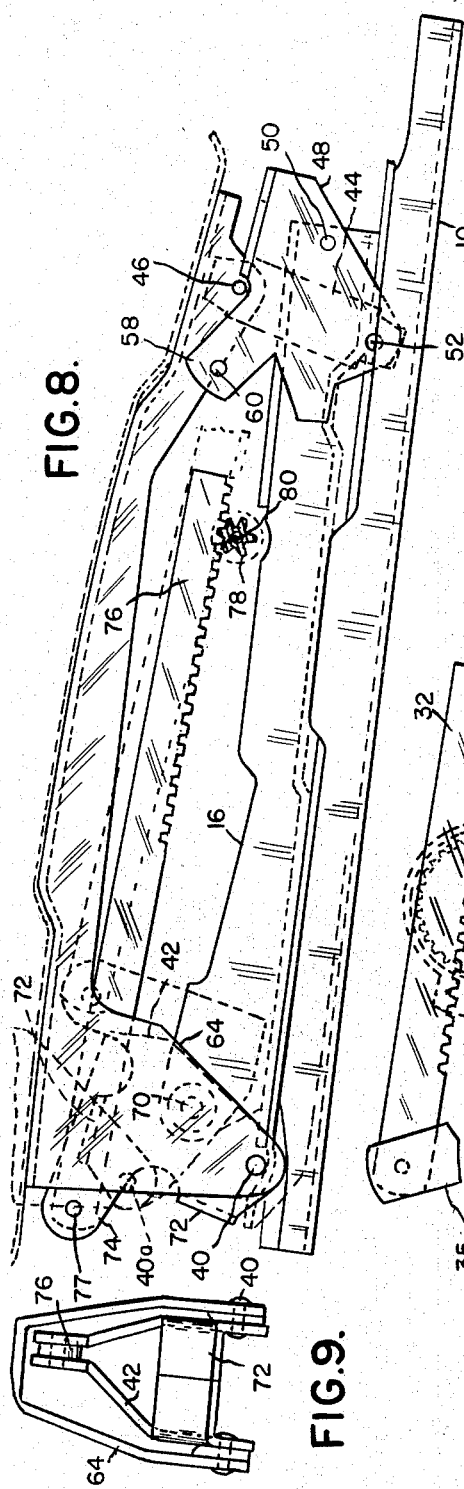
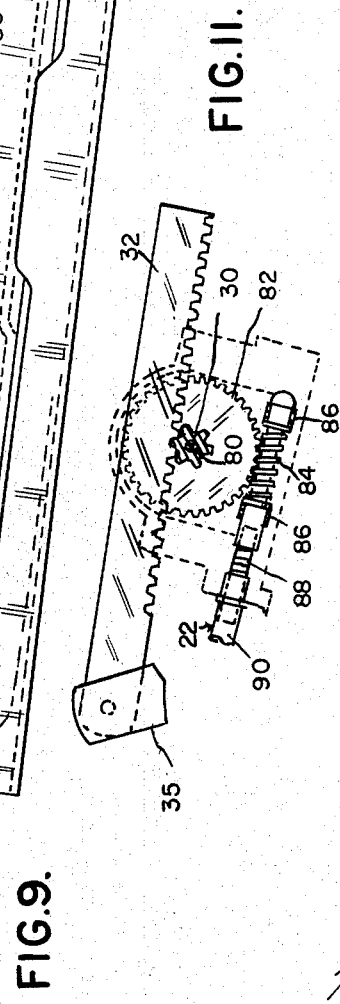
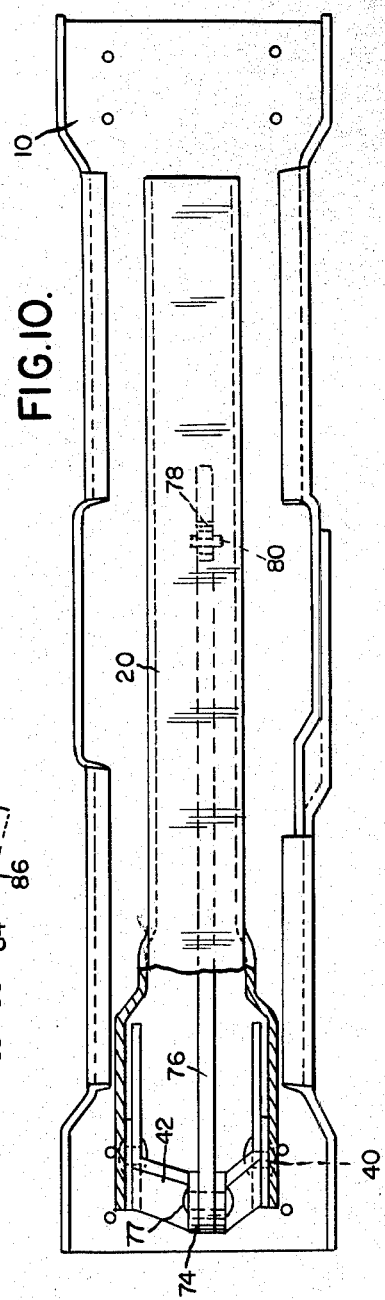
INVENTOR.
JOSEPH PICKLES
BY Whittemore,
Hulbert & Belknap
ATTORNEYS May 12, 1959  J. PICKLES  2,886,094
SEAT ADJUSTING MECHANISM
Filed April 30, 1956  5 Sheets-Sheet 5
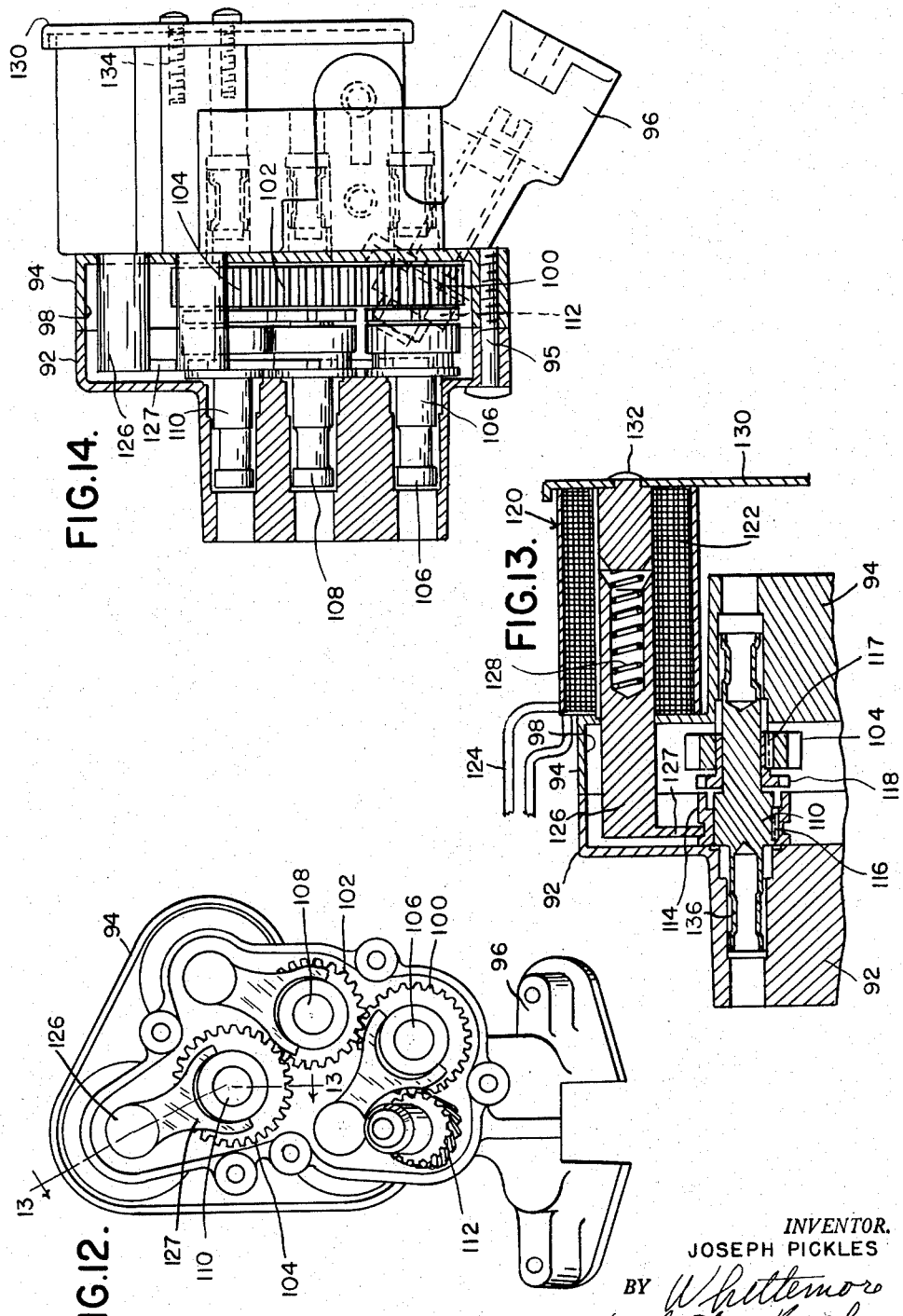
INVENTOR.
JOSEPH PICKLES
BY Whittemore
Hulbert & Belknap
ATTORNEYS

United States Patent Office 2,886,094
Patented May 12, 1959

2,886,094

SEAT ADJUSTING MECHANISM

Joseph Pickles, Dearborn, Mich., assignor to Ferro Stamping Company, Detroit, Mich., a corporation of Michigan Application April 30, 1956, Serial No. 581,676

12 Claims. (Cl. 155—14)

The present invention relates to seat adjusting mechanism, and more particularly, to seat adjusting mechanism capable of imparting multiple adjustments to the seat, and employing a single reversible motor in conjunction with selectively operable control means for effecting the desired adjustments.

It is an object of the present invention to provide a single motor multiple unit drive having control means for effecting selective actuation of a plurality of independent driven mechanisms.

It is a further object of the present invention to provide a single motor multiple unit drive adapted to effect simultaneous synchronous selective actuation of both members of each pair of a plurality of pairs of units.

It is a further object of the present invention to provide seat adjustment mechanism capable of effecting fore and aft adjustment, vertical adjustment, forward tilting or rearward tilting as desired.

It is a further object of the present invention to provide seat adjusting mechanism comprising a single motor having at least one set of flexible drive cables for selectively driving seat adjusting mechanisms at one end of a seat remote from the motor.

It is a further object of the present invention to provide multiple way seat adjusting mechanism including a single drive motor adapted to be located intermediate the ends of the seat, multiple adjusting mechanism comprising a plurality of pairs of driven members, the respective members of each pair being located at opposite ends of the seat, and drive means including flexible cables connecting said motor to said mechanisms.

It is a further object of the present invention to provide multiple way seat adjustment mechanism comprising a plurality of pinions arranged in pairs, the individual members of each pair being located at opposite ends of the seat construction, a rack associated with each pinion, and lever and linkage mechanism operatively connected with said racks to effect selective seat adjustment.

It is a further object of the present invention to provide a single motor, a plurality of gears in mesh with each other, drive means between said motor and one of said gears, and selectively operable clutch means for clutching each of said gears independently to a shaft on which it is mounted.

Other objects and features of the invention will become apparent as the description proceeds, especially when taken in conjunction with the accompanying drawings, wherein:

Figure 1 is a plan view of the seat adjusting mechanism with parts broken away.

Figure 2 is an enlarged end view of the support mechanism at one end of the seat.

Figure 3 is a fragmentary side elevational view showing the mechanism for effecting fore and aft seat adjustment.

Figure 4 is a fragmentary plan view of the structure shown in Figure 3.

Figure 5 is a fragmentary side view showing the mechanism for effecting vertical adjustment of the rear of the seat construction.

Figure 6 is a fragmentary end view of the structure shown in Figure 5.

Figure 7 is a fragmentary plan view of the structure shown in Figure 5, with parts broken away.

Figure 8 is a fragmentary side view showing the mechanism for effecting vertical adjustment of the front of the seat.

Figure 9 is a fragmentary end view of the structure shown in Figure 8.

Figure 10 is a fragmentary plan view of the structure shown in Figure 8, with parts broken away.

Figure 11 is a fragmentary view showing the mechanism for rotating the seat adjusting pinions.

Figure 12 is an end elevational view of a portion of the drive unit with the cover removed.

Figure 13 is a fragmentary sectional view on the line 13—13, Figure 12.

Figure 14 is a side view of the unit shown in Figure 12, partly in section.

Referring first to Figures 1 and 2, the construction comprises a pair of stationary track members 10 adapted to be fixedly secured to the floor of a vehicle to extend in a fore and aft direction adjacent the ends of a seat of the vehicle. Mounted for longitudinal movement on the track members 10 are longitudinally extending slide members 12 retained in position by overhanging portions 14 on the tracks 10. If desired, balls may be provided to facilitate longitudinal movement of the slide members relative to the stationary track members 10. Fixedly secured to the slide members 12 are slide frames 16, the frame and slide members being riveted as indicated at 18. Adjustably secured to the slide frames 16 are a pair of seat frame support bars 20 and the mechanism which adjustably supports the seat frame support bars 20 will be described in detail in conjunction with the later description. For the time being it is sufficient to note that mechanism including racks and pinions are provided for effecting relative adjustment between the seat frame support bars 20 and the stationary track members 10. The pinions are selectively driven in rotation by mechanism which in turn is driven by flexible drive cables 22 extending from the multiple drive unit indicated generally at 24 and including a single drive motor 26.

Referring now to Figures 3 and 4 there is shown the mechanism for effecting fore and aft seat adjustment. The slide frame 16 at each side of the seat carries a slave unit 28 which will subsequently be described in detail, but which includes three rotary driving pinions, one of which is shown at 30 in mesh with a rack 32. Secured to the side of the stationary track member 10 is a bracket 34 having an upwardly extending arm 35 to which the rack 32 is pivoted as indicated at 36. The opposite end of the rack 32 is free and the rack is therefore rockable about its pivot support 36 and remains in mesh with its driving pinion 30 at all times. It will be apparent that upon clockwise rotation of the pinion, as seen in Figure 3, the pinion is caused to roll to the left along the underside of the rack 32. Since the pinion is carried by the slave unit 28 which in turn is fixedly connected to the slide frame 16, this results in movement of the slide frame 16 and slide member 12 along the track 10. The seat frame support bar 20 is connected to the slide frame by mechanism to be subsequently described, and accordingly, the entire seat is caused to move longitudinally of the stationary track 10. Reversal of the pinion of course causes reverse movement of the seat.

As will subsequently appear, the mechanism for transmitting the drive from the motor to the pinion 30 includes irreversible drive means so that when the motor is disconnected or de-energized, the seat is locked in adjusted position.

Referring now to Figures 5-7 there is illustrated the mechanism for effecting vertical adjustment of the rear of the seat. As seen in this figure, the seat frame support bar 20 is provided with a pivot connection 40 to a lever 42 whose primary function will subsequently be described. For the time being however, the lever 42 and pivot 40 may be regarded as comprising a pivot support for the front of the seat frame support bar 20.

Adjacent the rear end of each of the slide frames 16 there is provided a link 44 the upper end of which is pivoted as indicated at 46 to the rear end of the seat frame support bar 20. Pivoted to the rear end of the slide frame 16 is a lever 48, the pivot connection being illustrated at 50. The lever 48 is pivoted at 52 to the lower end of the link 44. Accordingly, the rear end of the seat frame support bar 20 is connected to the rear end of the slide frame 16 by the link 44 and the lever 48. The slave unit whose outline is omitted from Figure 5 for clarity, includes a second driving pinion 54 in mesh with a second rack 56, the rack being pivotally connected at its rear end to an arm 58 on the lever 48 by pivot means indicated at 60. As the pinion 54 is rotated, the lever 48 is rocked in one direction or the other about its pivot axis 50 and the pivot connection 52 to the link 44 is accordingly raised and lowered. The seat frame support bar 20 is shown in full lines in its lowered position and in dotted lines in the raised position at which time the pivot connection 52 will have swung about the axis of the pivot connection 50 to the position indicated at 52a, the pivot connection 46 at that time occupying the position indicated at 46a.

Referring now to Figures 8-10 there is illustrated the mechanism for effecting substantially vertical adjustment of the front of the seat. During this adjustment the rear end of the seat may be regarded as pivoting about the axis of the pivot connection 46 since the lever 48 and link 44 may be stationary at this time.

Adjacent the front of the seat, the seat frame support bar at each side thereof includes a depending portion 64 which adjacent its lower end is pivoted as indicated at 40 to a lever 42 which in turn is pivoted as indicated at 70 to the forward end of the slide frame 16. The lever 42 includes a transverse abutment portion 72 and is formed of two plates including upwardly and forwardly extending ears 74 between which is received the forward end of a rack 76, a pivot connection 77 being provided between the forward end of the rack and the ears 74 of the lever construction 42.

In mesh with the rack 76 is a pinion 78 forward or reverse rotation of which effects substantially longitudinal movement of the rack and has the effect of rocking the lever construction 42 about its pivot connection 70. The pivot connection 40 between the lever 42 and the depending portion 64 at the forward end of the frame support bar 20 is thus caused to move in an arc about the axis of the pivot connection 70 and reaches an upper position indicated in dotted lines at 40a. From the foregoing it will be observed that by selective forward or reverse rotation of the pinions 30, 54 and 78, the seat may be shifted longitudinally of the vehicle, the rear of the seat may be raised and lowered, or the front of the seat may be raised and lowered. If the pinions 54 and 78 are both rotated in the proper direction to effect raising of the corresponding portion of the seat, it will be appreciated that substantially vertical movement may be imparted to the seat without tilting. Accordingly, the seat may be given eight different adjustments.

Referring now to Figures 11-14 there is illustrated the connections between the driving motor 26 and the respective rack engaging pinions such as the pinion 30, which has been selected for illustration in Figure 11. The pinion 30 is fixedly secured to a drive shaft 80, the drive shaft also carrying in fixed relation thereto a worm gear 82. The worm gear 82 is in mesh with a worm 84 the ends of which are journaled as indicated at 86 and one end of which is connected to the end of a flexible drive shaft 88 extending through a protective sheath 90, the parts making up one of the flexible drive cables 22 previously referred to.

Referring now more particularly to Figures 12-14 the drive unit comprises a housing formed of two parts 92 and 94 connected together by studs 95. The housing part 94 has secured thereto a mounting bracket 96 to which the motor 26 is adapted to be secured. The two parts of the housing when assembled together define a gear box 98 in which are located a plurality of gears 100, 102 and 104. The axes of these gears are parallel to each other and the gears are mounted in meshing relation on shafts 106, 108 and 110 respectively. Each of the aforementioned gears is mounted for free rotation on the shafts.

Within the gear box 98 is mounted a drive gear 112, its axis being inclined to the shaft 106 which supports the gear 100. The gears 100, 102 and 104 may conveniently be spur gears as indicated in Figure 14 in which case the drive gear 112 is a helical gear of the proper helix angle to mesh with the gear 100 in driving relation thereto. When the motor 26 is energized, the gears 100, 102 and 104, being in mesh with each other, all rotate freely on their respective shafts.

In order to effect selective control of remote mechanisms each of the shafts 106, 108 and 110 has clutch mechanism associated therewith and with the related gear. In Figure 13 the shaft 110 is shown as having a clutch element 114 which is keyed to the shaft as indicated at 116 but is longitudinally slidable thereon. The gear 104 is keyed as indicated at 117 to the clutch element 118.

In order to selectively control rotation of the shafts such as the shaft 110, solenoid means indicated generally at 120 is provided which includes windings 122 adapted to be energized by electrical conductors indicated at 124. The solenoid includes the plunger 126 having a fork 127 engageable with an annular groove on the clutch element 114. The plunger 126 is biased outwardly of the windings by a compression spring 128 and is thus effective to shift the clutch element 114 out of engagement with the clutch element 118 when the windings 122 are de-energized. When the windings are energized, the plunger 126 moves to the right as seen in Figure 13, thus engaging clutch elements 114 and 118 and effecting rotation of the shaft 110 as a result of the rotation of the gear 104. It will of course be appreciated that each of the gears 106 and 108 is selectively controlled by a separate solenoid.

The solenoids 120 are secured to a cover plate 130 as by rivets 132 and the entire cover plate is attached to the housing portion 94 by screws 134 or the like.

Opposite ends of the shafts 106, 108 and 110 are provided with coupling means for engaging in driving relation with the ends of flexible drive cables. In Figure 13 the coupling means for engaging the shaft 110 with the flexible cables is indicated at 136.

Referring again to Figure 1, it will be observed that the drive unit includes means for driving six flexible cables indicated generally at 22.

It will of course be apparent that selective control of the seat adjustment is effected by reversing the motor for either forward or reverse rotation and selectively controlling engagement of the several clutches so as to transmit rotation in the appropriate direction to the drive shafts 106, 108 and 110. It will further be observed that the driving connections to the pinions 30 includes a worm 84 and worm gear 82 so that upon de-energization of the motor or de-clutching of the drive shaft, the seat adjusting mechanism remains locked in its adjusted position.

While the single motor multiple unit drive has been illustrated in conjunction with a particular seat adjusting mechanism, it will of course be appreciated that so far as this mechanism is concerned, it may be associated with entirely different types of mechanisms such for example as window regulators or in fact, it may be associated with mechanisms having nothing to do with a vehicle. The single motor multiple unit drive mechanism is capable of general application although particularly well suited for coaction with the multiple way seat adjustment mechanism herein illustrated.

The drawings and the foregoing specification constitute a description of the improved seat adjusting mechanism in such full, clear, concise and exact terms as to enable any person skilled in the art to practice the invention, the scope of which is indicated by the appended claims.

What I claim as my invention is:

1. A drive unit comprising a reversible motor, a plurality of shafts mounted for independent rotation, a gear rotatably mounted on each of said shafts, said gears being in mesh with each other, independently operable clutch means for coupling each of said gears to the shaft on which it is mounted, a pair of flexible drive cables connected to opposite ends of each of said shafts, a worm connected to each of said flexible shafts, a worm gear in mesh with each of said worms, means supporting each of said worm gears for rotation about its axis, a pinion connected for rotation to each of said worm gears, and a rack in mesh with each of said pinions for effecting synchronous drive of each pair of a plurality of paired mechanisms, said racks and pinions being adapted for connection between relatively movable elements of said mechanisms.

2. Drive means for multiple adjustment seat supporting mechanism comprising seat supporting structures at opposite ends of a seat, each of said structures comprising a stationary track, an elongated slide movable longitudinally on said track, an elongated seat frame support bar, pivoted lever means connecting the front and rear ends of said slide and bar, said drive means comprising means for selectively swinging either or both of said lever means to effect tilting or substantially vertical movement of said bar, and for moving said slide longitudinally of said track, said drive means including three pinions adapted to be mounted on the slide, racks in mesh with said pinions, two of said racks being adapted to be connected to the lever means, the third rack being adapted to be connected to the track.

3. Drive means for multiple adjustment seat supporting mechanism comprising seat supporting structures at opposite ends of a seat, each of said structures comprising a stationary track, an elongated slide movable longitudinally on said track, an elongated seat frame support bar, pivoted lever means connecting the front and rear ends of said slide and bar, said drive means comprising means for selectively swinging either or both of said lever means to effect tilting or substantially vertical movement of said bar, and for moving said slide longitudinally of said track, said drive means including three pinions adapted to be mounted on the slide, racks in mesh with said pinions, two of said racks being adapted to be connected to the lever means, the third rack being adapted to be connected to the track, a single motor drive unit for driving the three pinions at both ends of the seat, transmission means comprising flexible drive shaft means extending from said drive unit to the pinions at one side of said seat, and selectively operable means for simultaneously connecting and disconnecting the like pinions at opposite ends of the seat.

4. Drive means for multiple adjustment seat supporting mechanism comprising seat supporting structures at opposite ends of a seat, each of said structures comprising a stationary track, an elongated slide movable longitudinally on said track, an elongated seat frame support bar, pivoted lever means connecting the front and rear ends of said slide and bar, said drive means comprising means for selectively swinging either or both of said lever means to effect tilting or substantially vertical movement of said bar, and for moving said slide longitudinally of said track, said drive means including three pinions adapted to be mounted on the slide, racks in mesh with said pinions, two of said racks being adapted to be connected to the lever means, the third rack being adapted to be connected to the track, a single motor drive unit for driving the three pinions at both ends of the seat, transmission means comprising a separate flexible drive shaft extending from said unit to the seat supporting structure at one end of the seat for each of said pinions and operably connected thereto.

5. Drive means for multiple adjustment seat supporting mechanism comprising seat supporting structures at opposite ends of a seat, each of said structures comprising a stationary track, an elongated slide movable longitudinally on said track, an elongated seat frame support bar, pivoted lever means connecting the front and rear ends of said slide and bar, said drive means comprising means for selectively swinging either or both of said lever means to effect tilting or substantially vertical movement of said bar, and for moving said slide longitudinally of said track, said drive means including three pinions adapted to be mounted on the slide, racks in mesh with said pinions, two of said racks being adapted to be connected to the lever means, the third rack being adapted to be connected to the track, a single motor drive unit for driving the three pinions at both ends of the seat, transmission means comprising a separate flexible drive shaft extending from said unit to the seat supporting structures at both ends of the seat for each of said pinions and operably connected thereto.

6. Drive means for seat adjusting mechanism comprising a seat, a support, a pair of levers pivoted to said support and to opposite edges of said seat, said levers being operable independently to effect tilting of the seat and operable in unison to effect substantially vertical seat movement, said drive means comprising racks adapted to be pivotally connected to each of said levers, drive pinions adapted to be carried by said support in mesh with each of said racks, and drive means for rotating said pinions.

7. Drive means for seat adjusting mechanism comprising a seat, a support, a pair of levers at both ends of a vehicle seat pivoted to said support and to opposite edges of said seat, said levers being operable independently to effect tilting of the seat and operable in unison to effect substantially vertical seat movement, said drive means comprising racks adapted to be pivotally connected to each of said levers, drive pinions adapted to be carried by said support in mesh with each of said racks, a drive unit, and flexible drive shafts extending from said unit and operably connected to each of said pinions.

8. Drive means for seat adjusting mechanism comprising a seat, a support, a pair of levers at both ends of a vehicle seat pivoted to said support and to opposite edges of said seat, said levers being operable independently to effect tilting of the seat and operable in unison to effect substantially vertical seat movement, said drive means comprising racks adapted to be pivotally connected to each of said levers, drive pinions adapted to be carried by said support in mesh with each of said racks, a drive unit, a plurality of flexible drive shafts extending from said unit, worms on said flexible shafts, worm gears in mesh with said worms and connected in driving relation to said pinions.

9. Drive means for vehicle seat adjustment mechanism comprising a pair of tracks adapted to be fixed to the floor of a vehicle to extend fore and aft therein, slides for said tracks, frame bars disposed above said tracks, lever means pivotally connecting the front and rear ends of said bars and slides, said drive means comprising a slave unit adapted to be mounted on each of the slides and comprising three pinions, a pair of racks in mesh with two of said pinions of each slave unit and adapted to be pivotally connected to the lever means, a rack in mesh with the third pinion of each slave unit and adapted to be connected to a fixed portion of the track, said drive means further including flexible drive shafts for selectively synchronously rotating corresponding pinions at opposite sides of the seat.

10. Drive means for vehicle seat adjustment mechanism comprising a pair of tracks adapted to be fixed to the floor of a vehicle to extend fore and aft therein, slides for said tracks, frame bars disposed above said tracks, lever means pivotally connecting the front and rear ends of said bars and slides, said drive means comprising a slave unit adapted to be mounted on each of the slides and comprising three pinions, a pair of racks in mesh with two of said pinions of each slave unit and adapted to be pivotally connected to the lever means, a rack in mesh with the third pinion of each slave unit and adapted to be connected to a fixed portion of the track, said drive means further comprising a master unit including a single reversible electric motor, and separate flexible drive shafts connecting said motor to each of the pinions.

11. Drive means for vehicle seat adjustment mechanism comprising a pair of tracks adapted to be fixed to the floor of a vehicle to extend fore and aft therein, slides for said tracks, frame bars disposed above said tracks, lever means pivotally connecting the front and rear ends of said bars and slides, said drive means comprising a slave unit adapted to be mounted on each of the slides and comprising three pinions, a pair of racks in mesh with two of said pinions of each slave unit and adapted to be pivotally connected to the lever means, a rack in mesh with the third pinion of each slave unit and adapted to be connected to a fixed portion of the track, a master unit including a single reversible electric motor, separate flexible drive shafts connecting said motor to each of the pinions, and solenoid actuated clutches for selectively coupling and disconnecting the pairs of flexible shafts extending to corresponding pinions to and from said motor.

12. In an automotive vehicle, mechanism for effecting independent selective forward and reverse actuation of a plurality of widely separated devices such as power seats and power windows including relatively movable elements from a single motor comprising a reversible electric motor, a support for said motor, a plurality of independently rotatable shafts on said support, a gear rotatably mounted on each of said shafts, a drive gear connected to said motor, each of said gears being in mesh with another thereof, solenoid actuated clutch means associated with each of the gears on said shafts and selectively operable to connect any gear in driving relation to the shaft on which it is mounted, a flexible drive cable connected to each of said shafts, power means connected to each of said cables including a rotary driving means connected to the end of said cable opposite the shaft to which it is connected, said driving means comprising a worm, a unitary worm gear and pinion, the worm gear being in mesh with the worm, a rack in mesh with the pinion, said racks and pinions being adapted for connection between the relatively movable elements of said devices, and switch means for energizing said motor and simultaneously actuating one of said clutches to couple a selected one of said shafts and its flexible driving cable to said motor.

References Cited in the file of this patent
UNITED STATES PATENTS

| | | |
|---|---|---|
| 1,421,571 | Rodger | July 4, 1922 |
| 1,680,676 | Gearing | Aug. 14, 1928 |
| 1,814,424 | Barr | July 14, 1931 |
| 2,101,350 | Simpson et al. | Dec. 7, 1937 |
| 2,324,587 | Krogh | July 20, 1943 |
| 2,526,758 | Lemons | Oct. 24, 1950 |
| 2,533,595 | Luketa | Dec. 12, 1950 |
| 2,609,029 | Haberstump | Sept. 2, 1952 |
| 2,629,428 | Luketa | Feb. 24, 1953 |
| 2,632,336 | Luketa | Mar. 24, 1953 |
| 2,641,305 | Oishei | June 9, 1953 |
| 2,665,740 | Rappl | Jan. 12, 1954 |
| 2,765,024 | Brundage | Oct. 2, 1956 |
| 2,809,688 | Brundage | Oct. 15, 1957 |